United States Patent
Hollis et al.

(10) Patent No.: US 11,684,121 B2
(45) Date of Patent: Jun. 27, 2023

(54) VERTICALLY LAPPED NONWOVEN IN FOOTWEAR

(71) Applicant: Piana Nonwovens, LLC., Cartersville, GA (US)

(72) Inventors: Andy Hollis, Cartersville, GA (US); Michael Stephen DeFranks, Cartersville, GA (US); Eric McCann, Cartersville, GA (US); Andrea Piana, Cartersville, GA (US)

(73) Assignee: Piana Nonwovens, LLC., Cartersville, GA (US)

( * ) Notice: Subject to any disclaimer, the term of this patent is extended or adjusted under 35 U.S.C. 154(b) by 17 days.

(21) Appl. No.: 17/195,929

(22) Filed: Mar. 9, 2021

(65) Prior Publication Data

US 2021/0282500 A1 Sep. 16, 2021

Related U.S. Application Data

(60) Provisional application No. 62/989,198, filed on Mar. 13, 2020.

(51) Int. Cl.
  *A43B 17/10* (2006.01)
  *A43B 23/02* (2006.01)

(52) U.S. Cl.
  CPC ........ *A43B 17/107* (2013.01); *A43B 23/0235* (2013.01)

(58) Field of Classification Search
  CPC ........... A43B 1/06; A43B 1/025; A43B 1/028; D04H 11/04

USPC .......................................................... 36/9 A
See application file for complete search history.

(56) References Cited

U.S. PATENT DOCUMENTS

| | | | | |
|---|---|---|---|---|
| 3,484,881 A | * | 12/1969 | Krieger | A43B 1/04 36/45 |
| 5,511,323 A | * | 4/1996 | Dahlgren | A43B 7/08 36/3 A |
| 5,924,221 A | * | 7/1999 | Schuver | A43B 23/24 36/3 A |

(Continued)

FOREIGN PATENT DOCUMENTS

| | | | | |
|---|---|---|---|---|
| CA | 3024893 A1 | * | 11/2017 | A43B 1/0045 |
| ES | 2428641 A1 | * | 11/2013 | A43B 3/122 |

(Continued)

*Primary Examiner* — Sharon M Prange
*Assistant Examiner* — Grady Alexander Nunnery
(74) *Attorney, Agent, or Firm* — WCF IP (57) ABSTRACT

Footwear with vertically lapped nonwoven layers in upper and sole structures for enhanced breathability and moisture wicking is disclosed. Exemplary vertically lapped nonwoven dual layers comprise one or more hydrophobic layers and one or more hydrophilic layers that are adhered to each other by a plurality of methods and are further integrated into the inside of the upper and sole of the footwear so that the hydrophilic layer is in direct contact with the feet. The hydrophilic part of the dual layer wicks sweat or bodily fluid from the wearer into the nonwoven and transports the moisture to the hydrophobic layer for fast evaporation, thus keeping the feet dry. The nonwoven footwear is environmentally friendly as the nonwoven layers can be made of recycled materials and may be fully recyclable.

9 Claims, 7 Drawing Sheets

(56) References Cited

U.S. PATENT DOCUMENTS

| | | | |
|---|---|---|---|
| 2004/0139628 A1* | 7/2004 | Wiener | A43B 23/07 36/55 |
| 2010/0199406 A1* | 8/2010 | Dua | D06H 5/00 2/243.1 |
| 2014/0165422 A1 | 6/2014 | Pfister et al. | |
| 2014/0325871 A1* | 11/2014 | Price | A43B 13/14 36/28 |
| 2016/0374428 A1* | 12/2016 | Korman | A43B 23/0215 36/28 |
| 2017/0015825 A1* | 1/2017 | Ting | B29D 35/122 |
| 2017/0213382 A1 | 7/2017 | Torvinen et al. | |
| 2018/0263339 A1 | 9/2018 | Neumann et al. | |
| 2019/0366590 A1 | 12/2019 | Farris et al. | |
| 2020/0068991 A1* | 3/2020 | Steere, Jr. | A43B 3/24 |

FOREIGN PATENT DOCUMENTS

| | | | | |
|---|---|---|---|---|
| JP | 2500529 Y2 * | 6/1996 | | B32B 5/26 |
| KR | 101067340 B1 * | 9/2011 | | A43B 7/12 |

* cited by examiner

VERTICALLY LAPPED NONWOVEN IN FOOTWEAR

CROSS-REFERENCE TO RELATED APPLICATIONS

This application claims priority to U.S. Provisional Application 62/989,198 filed on Mar. 13, 2020. The complete content thereof is herein incorporated by reference.

FIELD OF THE INVENTION

The disclosure generally pertains to vertically lapped (perpendicular-laid) nonwoven applications in footwear, and more specifically the use of nonwoven layers in an upper and/or sole of footwear and/or portions thereof.

BACKGROUND

Proper moisture management in footwear is necessary for providing sufficient comfort and functional performance for the intended use. The particular aspect of moisture control is especially important in athletic footwear and work shoes, which are used for a variety of activities including walking, running, outdoor activities, sports activities etc. With such footwear, the accumulation of excessive perspiration around the foot and inside the footwear may cause uncomfortable and irritable foot problems such as bacterial and/or fungal infections. The foot problems are exacerbated not only while performing strenuous work or activities but also while wearing the footwear with synthetic non-porous uppers and/or soles (e.g. polyurethane coated uppers and/or soles) that often do not provide sufficient air circulation and are known to trap sweat and body oils inside of the shoes.

Generally, footwear will include two primary elements, an upper which covers the upper parts of the foot and a sole structure which is placed between the bottom of a foot and the ground to provide support and to maintain traction while running or walking. The upper includes the heel area and extends outwardly from an outer peripheral edge of the sole to securely receive and position the foot with respect to the sole structure. A variety of materials are commonly used for manufacturing the upper, including fabrics, natural or synthetic leather, natural and synthetic rubber and foams. Despite offering good resiliency and elasticity, especially the synthetic foams, those materials are relatively poor in moisture transport and are not "breathable". In addition, the use of the above materials increases the cost of the footwear as well as taking a toll on the environment as the majority of the listed materials are often not recyclable.

In particular, for the limited-use footwear (i.e., the footwear that may be suitable for single- or limited-use in hotels, inns, factories, food processing plants, electronic assembly areas, clean rooms, hospitals, airplanes, schools, gyms, public halls, or ordinary household for guests), little effort is made to provide comfort, durability and/or breathability. Further, since these types of shoes are often worn without socks, the use of materials that are soft to touch and highly absorbing should be used in the upper and sole of the footwear. Ideal footwear products may be recyclable, cost-effective, breathable, lightweight, and highly absorbent to aid keeping skin dry and comfortable, however, such footwear products are rarely manufactured. There is a need in the art for affordable and environmentally friendly footwear with improved breathability and comfort and more specifically to reduce moisture retention during prolonged wear as well as to provide adequate strength and support.

SUMMARY OF THE INVENTION

An object of the invention is to use vertically lapped nonwoven as a replacement of a non-porous synthetic upper and/or a sole in footwear to enhance adequate air exchange and breathability and to provide a comfortable housing for prolonged wear for a plurality of use conditions. In a particular preferred embodiment, the footwear disclosed herein provides vertically lapped nonwoven layers in the upper and/or the sole of the footwear. A plurality of types and structures of footwear manufactured with vertically nonwoven layers, including the footwear with closed heel and/or closed front (e.g., athletic footwear, outdoor-work footwear) and with open heel and/or open front (e.g., sandals, slippers, flip-flops), are described herein.

One aspect of the disclosure provides nonwoven layers in the upper and/or the sole of the footwear, where such nonwovens are in a multi-layered system, and most preferably, in a dual layer in which each layer is completely or partially formed from hydrophobic and/or hydrophilic materials. Dual layer of hydrophilic and hydrophobic materials offers numerous advantages over commonly used synthetic fibers, polyurethane foam or leather coated with polyurethane, including versatility, higher cushioning, high resiliency, higher breathability, superior cooling, eco-friendly and excellent mechanical properties. As noted above, the vertically lapped nonwovens comprising different "wettability" materials may be further folded and bonded together to create a multi-layer, providing further structural strength and superiority in air permeability and efficient moist air circulating system in the upper and/or sole of the footwear.

In one embodiment, hydrophilic fibers (e.g., cellulosic fibers) and hydrophobic fibers (e.g., polyester fibers) are used for the inner and the outer layer of the upper and/or sole of the footwear, respectively. As such, one or more inner layers with hydrophilic materials absorbs and wicks moisture and/or perspiration from wearer's foot and transfers the moisture to one or more hydrophobic outer layers for efficient evaporation of the condensation and circulation of moist air, thus managing wetness at the source as well as keeping the surface dry for comfortable wear.

In addition, in some embodiments, the nonwoven layers disclosed herein are environmentally friendly (completely or partially made from recycled materials), odorless and do not emit volatile organic compounds. Additional functional treatments (e.g., cooling, anti-allergen, probiotic, odor control, UV activated deodorizer, antimicrobial, scent, etc.), depending on the intended application of the footwear, may be incorporated in these embodiments. As stated above, the present invention is inexpensive, recyclable, lightweight and easy to manufacture. The present invention overcomes the shortcomings of prior products as it is advantageous to air circulation, sweat or bodily fluid absorbency and is highly durable.

Additional features and advantages of the present invention will be set forth in the description of disclosure that follows, and in part will be apparent from the description of may be learned by practice of the disclosure. The disclosure will be realized and attained by the compositions and methods particularly pointed out in the written description and claims hereof.

DETAILED DESCRIPTION

The preferred embodiments of the present disclosure are directed toward multilayers of vertically lapped nonwovens in footwear. These embodiments benefit from an absorbency, breathability, as well as a cushioning functionality which can be achieved with vertically lapped nonwovens incorporated into various types of footwear. As used herein, by "footwear", it is meant one or a plurality of apparels or garments that are used for protection of the feet against adversities of the environment, usually regarding ground textures and temperature. Footwear described herein primarily serves the purpose to ease the locomotion and prevent injuries but may also be used for fashion and adornment. Some exemplary types of footwear include, but are not limited to, boots, athletic shoes, dance flats, diabetic shoes, mules, high-tops, skate shoes, school shoes, sneakers, toe shoes, sandals, flip-flops, closed slippers, open slippers, clogs, surgical shoes, etc. The present nonwoven layers are highly suited as a replacement of synthetic fibers, materials (e.g. polyurethane) or coating of synthetic fibers on leathers or on fabrics in footwear, in which the one side of the layer comes in direct contact with the feet of the wearer; the feet being with or without socks. As noted above, all or portions of the nonwoven layers disclosed in the present invention are vertically lapped.

Conventional articles of footwear include two primary elements, an upper which covers the upper parts of a foot and a sole structure which is placed between the bottom of a foot and the ground to provide support and to maintain traction while running or walking. The upper includes the heel area and extends outwardly from an outer peripheral edge of the sole to securely receive and position the foot with respect to the sole structure. Both the upper and sole may have a configuration that protects the foot and provides ventilation, thereby cooling the foot and removing perspiration. The upper forms a void on the interior of the footwear for receiving the foot. The void has the general shape of the foot and access to the void is provided at an ankle opening. The upper may extend over the instep and toe areas of the foot, along the medial and lateral sides of the foot, and around the heel area of the foot.

The uppers may have a mechanism (e.g., laces, straps with buckles, zippers, elastic, Velcro straps, buttons, snaps, rubber bands, etc.) to tighten the upper on the foot. A lacing system often is incorporated into the upper to allow selective changes to the size of the ankle opening and to permit the wearer to modify certain dimensions of the upper to accommodate feet with varying proportions. In addition, the upper may include a tongue that extends under the lacing system to enhance the comfort of the footwear. The upper also may include a heel counter to limit or control movement of the heel. In some embodiments, the front part of the footwear, starting behind the toe and extending around the eyelets towards back part of the shoe, may be referred as a vamp. Further, the rear and sides of the upper that covers the heel behind the vamp may be referred as a quarter.

In the simplest configurations, such as sandals or flip-flops, the footwear may only include one or more straps in purpose of holding the sole in place. In this case, the upper (i.e. straps) is connected to the sole by a strip of leather, rubber, or plastic that is stitched between the upper and the sole, also known as a welt.

The sole structure generally incorporates multiple layers that are conventionally referred to as an "insole", a "midsole" and an "outsole". The insole is a thin layer or membrane located within the bottom plantar surface of the foot to enhance comfort (to wick away moisture and provide a soft, comfortable feel). The midsole, traditionally attached to the upper along the entire length of the upper, forms the middle layer of the sole structure and serves a variety of purposes that include controlling foot motions and attenuating impact forces. The outsole forms the ground-contacting element of footwear and is usually manufactured from a durable, wear-resistant material that includes texturing or other features to improve traction. As such, the sole member or structure of footwear may include a layered configuration that includes a cushioning insole for shock absorption and support to the foot, a midsole of foam material and an outsole that is in contact with the ground surface. However, the sole structure in the simplest footwear, such as sandals or flip-flops, may be constructed with only one layer.

As used herein, the term "vertically lapped" refers to one or a plurality of materials is in the form of a web that has been folded in on itself in a corrugated fashion to produce a three-dimensional structure that has been thermally bonded and often is also referred to as perpendicular laid. A "vertical lapper" is also referred to as a "STRUTO" or a "V-LAP" and some examples of machinery which may be used to make vertically lapped nonwovens for use in the invention are herein incorporated by reference (WO 2015176099 to Cooper and U.S. Pat. No. 7,591,049 to Cooper). Vertically lapped nonwovens are higher in compressional thermal resistance and lighter in weight than those made of fibers horizontally lapped, horizontally cross-lapped, horizontally woven and/or polyurethane foams. The vertically lapped nonwoven process takes a carded fiber web and laps it vertically (i.e. pleating) rather than horizontally laying the fibers. The size, shape and arrangement of the material of nonwovens may vary widely as long as nonwovens are made directly from separate fibers, molten plastic or plastic films, but not made by weaving or knitting. In an exemplary embodiment, the nonwoven is manufactured by hot-air thermal bonding using low-melt and/or elastomeric binder fibers. The binding fibers serve to mix readily with the other fibers of a nonwoven, and to melt on application of heat and then to re-solidify to hold the other fibers in the nonwoven together. In some applications, the binding fibers might have a core-sheath configuration where the sheath melts on application of heat and functions to hold the other fibers of the nonwoven together. A plurality of nonwoven formation processes, in addition to meltblowing, spunbonding, airlaying, conforming, hydroentangling, and bonded carded web processes, may be used.

In particular, the nonwoven can have a basis weight ranging from 0.1-5.0 oz/ft$^2$; however, the basis weight of the nonwoven can vary widely depending on the intended application and desired characteristics of the nonwoven. A plurality of fibers, from natural to synthetic, may be used for manufacture of vertically lapped nonwovens. The nonwoven can include combinations of two or more different natural fibers; two or more different man-made synthetic fibers; blends containing one or more natural fibers and one or more man-made fibers. Exemplary fibers which can be used in the practice of the invention include but are not limited to cotton, kapok, flax, ramie, kenaf, abaca, coir, hemp, jute, sisal, rayon, bamboo fiber, Tencel®, and Modal® fibers, glass fibers, basalt fibers, Kevlar® fibers, aramid fibers, polyester fibers (e.g., which can function both as a binder fiber but, depending on the polyester, as part of the nonwoven blend), wool (which may be obtained, for example, from one of the forty or more different breeds of sheep, and which currently exists in about two hundred types of varying grades), silk, rayon (a man-made fiber that may include viscose rayon and cuprammonium rayon), acetate (a man-made fiber), nylon (a man-made fiber), acrylic(a man-made fiber), polyester (a man-made fiber), triacetate (a man-made fiber), spandex (an elastomeric man-made fiber such as Lycra®), polyolefin/polypropylene (man-made olefin fibers), microfibers and microdeniers, lyocell (a man-made fiber), vegetable fiber (a textile fiber of vegetable origin, such as cotton, kapok, jute, ramie, polylactic acid (PLA) or flax), vinyl fiber (a manufactured fiber), alpaca, angora, carbon fiber (suitable for textile use); (t) glass fiber (suitable for textile use), raffia, ramie, vinyon fiber (a manufactured fiber), Vectran® fibers (manufactured fiber spun from Celanese Vectra® liquid crystal polymer), and waste fiber. Fibers are commercially available from sources known by those of skill in the art, for example, E.I. Du Pont de Nemours & Company, Inc. (Wilmington, Del.), American Viscose Company (Markus Hook, Pa.), Teijin Frontier Co., Ltd. (Osaka, Japan), Tintoria Piana USA (Cartersville, Ga.), and Celanese Corporation (Charlotte, N.C.).

Moreover, the nonwoven can be formed using fibers that are treated with chemicals (e.g., dyes (for coloring of some or all of the fibers), fire retardant chemicals (e.g., phosphates, sulfates, silicates, etc.), scent's (perfumes, etc.), topical additives such as phase change material particles, talc, carbon nanotubes, etc.). Alternatively, a plurality of chemicals (e.g., dyes, scents, fire retardant chemicals, addition of microparticles, etc.) may be used to treat the nonwoven after completion of the final assembly of a structure.

Figure 1A:
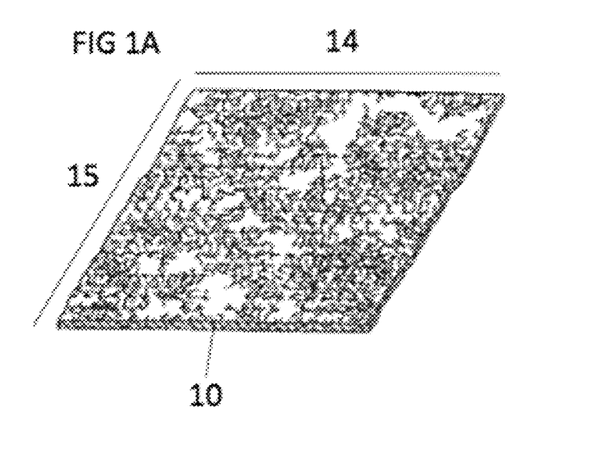
FIG. 1A is a plan view of an exemplary vertically lapped nonwoven in a single layer.
Figure 1B:
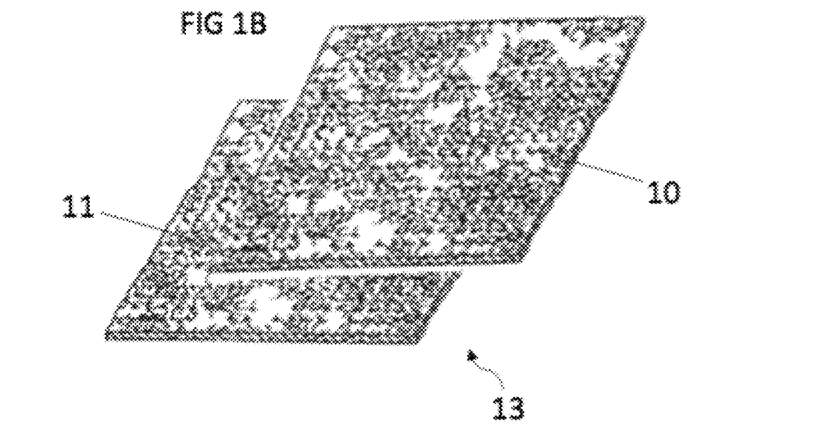
FIG. 1B is a side view of exemplary two layers of vertically lapped nonwovens.
Figure 1C:
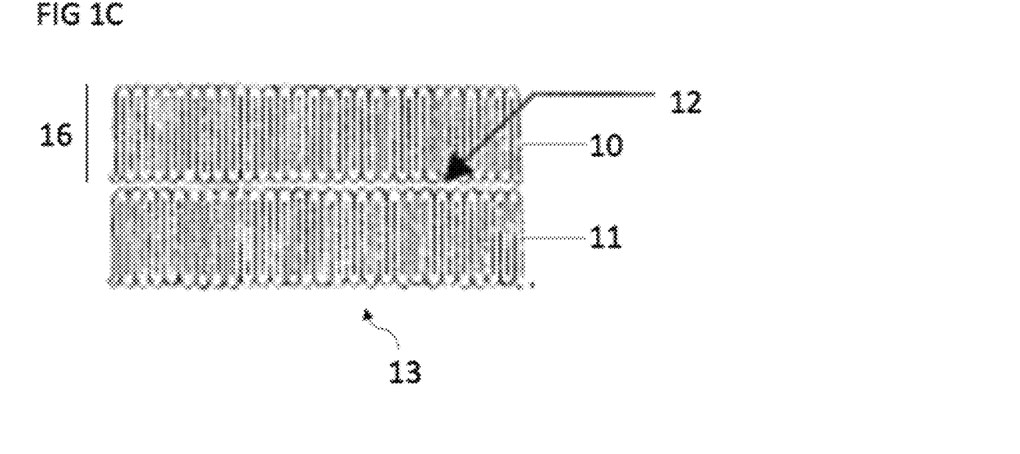
FIG. 1C is a cross-sectional side view of an exemplary dual layer of vertically lapped nonwovens after adhesion.

FIG. 1A-C shows a plan, a side and a cross-sectional view of an embodiment of the invention of the vertically lapped nonwoven 10, wherein the entirety of the nonwoven is vertically lapped. In this embodiment, the nonwoven 10 has height 16, width 14, and depth 15 dimensions and these dimensions can be of any size desired depending on the intended application. In some embodiments, the nonwoven may have a depth 15 of 2-20 inches, a width 14 of 0.5-6 inches, and a height 16 of 0.125-1.5 inches.

In some embodiments, the vertically lapped nonwoven layers may be arranged as a single layer or multiple layers. It is preferred that the vertically lapped nonwoven layer has a thickness within the range of 0.125 to 1 inch, more preferably 0.125 to 0.5 inches. The preferred thickness is around 0.25 inches. The aforementioned thicknesses are preferred for a single layer of the nonwovens. In a dual layer configuration, each layer of nonwoven may be and is preferably made in the same or different thicknesses.

In a particularly preferred embodiment of the invention, the vertically lapped nonwovens are in a dual layer system 13, as shown in FIGS. 1B and 1C. In making of dual layer nonwovens, one vertically lapped nonwoven 10 is adhered to or otherwise connected to an underlying vertically lapped non-woven 11. The dual layer may be bonded, attached or adhered by a plurality of methods, e.g., chemical bonding (e.g., saturation, spraying screen printing, and foam), mechanical bonding (e.g., needle punching, hydro-entangling) and thermal bonding (e.g., air heating and calendaring), etc. In the most preferred embodiment, the top layer 10 is made of hydrophilic materials to improve wicking and absorption of moisture whereas the bottom layer 11 is made of hydrophobic materials for fast drying and moisture removal. Suitable wicking materials include those composed of regenerated cellulosic fibers which may be blended with synthetic materials or used alone. It is preferred that the wicking layer is a nonwoven fabric comprising a proportion of hydrophilic fibers or hydrophobic fibers that may be exhausted, coated or have the surface modified using any methods known in the art (e.g., plasma treatment, fiber finish, masterbatch additives) to enable them to absorb moisture and/or sweat. Inherently hydrophilic fibers in the art are composed of natural materials such as cellulose in native fiber form, e.g., cotton, flax, hemp, ramie, modal, wool etc. or cellulose in regenerated form, e.g., lyocell (Tencel), viscose rayon, etc. Some exemplary hydrophobic fibers include polyester, acrylic, modacrylic, polypropylene and nylon. It is to be understood that the terms "hydrophilic" and "hydrophobic" are broad terms and are used in accordance with its ordinary meaning. The term "hydrophilic material" may be defined as, but is not limited to, the material with the surface having a strong affinity to water and having the contact angle between the water and solid phase of less than 90°. Accordingly, the term "hydrophobic" may be defined as, but is not limited to, the material with the surface contact angle greater than 90°.

FIG. 1C shows a cross-sectional view of the vertically lapped nonwoven dual layer embodiment of the invention. When the entirety of nonwoven is vertically lapped, the top outer surface of the layer has channels or gaps 12, which allow air to pass freely between portions of the nonwoven, thus providing cooling to the user's skin and allowing a ready passage of sweat into the nonwoven. Alternatively, the gaps or space 12 between two layers nonwoven can also be kept or, depending on the desired applications, the gaps may be larger, more defined, and/or regular by using a molding process, followed by space-permitting adhesion methods (e.g., stitching).

Figure 2:
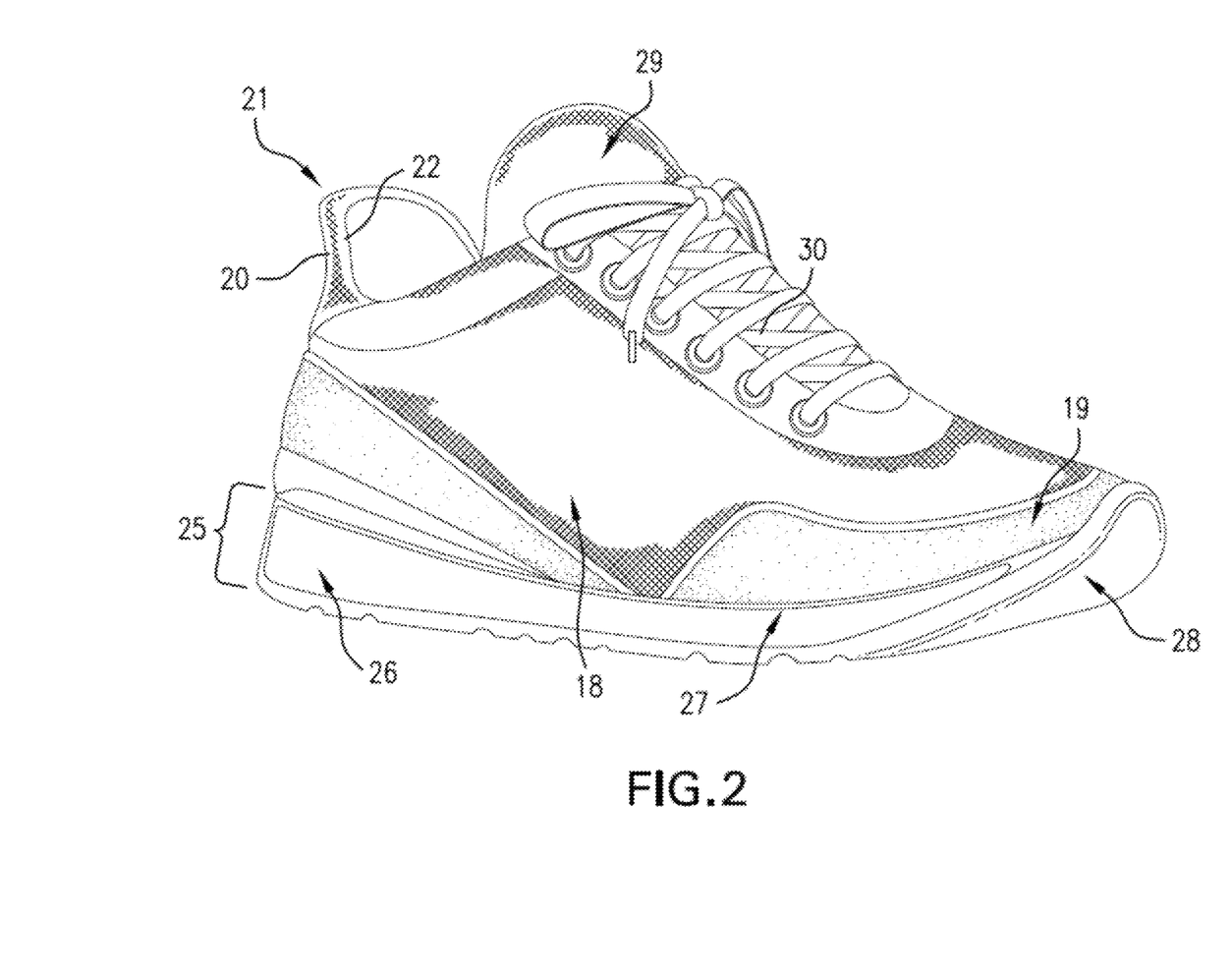
FIG. 2 is a perspective view of an exemplary athletic footwear with vertically lapped nonwovens in a dual layer configuration in an upper and a sole of footwear.

In FIG. 2, a perspective view of an exemplary athletic footwear with vertically lapped nonwovens in an upper and a sole of the footwear is shown. In one embodiment, the athletic shoe 17 comprises an upper (includes frontal 19, medial 18 and heel 20 portions) and a sole 25 (includes insole 27, midsole 26 and outsole 28) in accordance with the present invention. In contrast with the conventional articles of footwear that generally have one layer composed of a single material, two or more layers (e.g., 2, 3, 4, 5, or 6 or more layers) of vertically lapped nonwovens comprising hydrophilic and hydrophobic materials may be placed in both the upper 18, 19, 20 and sole 25. In particular, the nonwoven dual layer 21 is essentially the same as the dual layer 13 depicted in FIG. 1C, except that the dual layer 21 is molded and compacted as an upper of the footwear in a variety of forms. In some embodiments, 10-100% of the upper 18, 19, 20 comprises the nonwovens. In another embodiments, 10-100% of the sole 25 comprises the nonwovens. In yet another embodiment, all or some parts of the upper (a heel portion 20, a midfoot portion 18, and/or a forefoot portion 19) are manufactured with the nonwovens. The outer layer of the upper may further include textile materials, for example, a mesh cloth that provides enhanced air-permeability and moisture-wicking properties.

The dual layer system preferably has the length, width, depth and shape which are complementary to the size and shape of the wearer's foot so as to assist in positioning and securing the foot in the footwear. The vertically lapped nonwoven dual layer has a thickness within the range of 0.125 to 1.5 inch, more preferably 0.125 to 1 inches, and most preferably 0.125 to 0.5 inches. The preferred thickness is around 0.25 inches. In a dual- or multi-layer, the size and/or thickness of the inner hydrophilic layer may be smaller, equal or larger than that of the outer hydrophobic layer. Preferably, the thickness of the inner layer matches the thickness of the outer layer. Alternatively, the thickness of the nonwoven dual layer may be less than 0.125 inches (e.g. 0.04, 0.06, 0.08, or 0.1 inches), especially when the nonwoven is an upper of footwear.

In some embodiments, the sole 25 is in a layered configuration that includes an insole 27, a midsole 26, and an outsole 28. All or at least some portions of the midsole 26 and insole 27 may be nonwovens, replacing more commonly used ethylvinylacetate or polyurethane foams. Furthermore, in this embodiment, a tongue 29, which a separate strip on the upper for the purpose of making it easier to put on the footwear as well as preventing a fastening system 30 (e.g., shoelaces) from rubbing against an instep of the foot, may also comprise the nonwovens.

Figure 3:
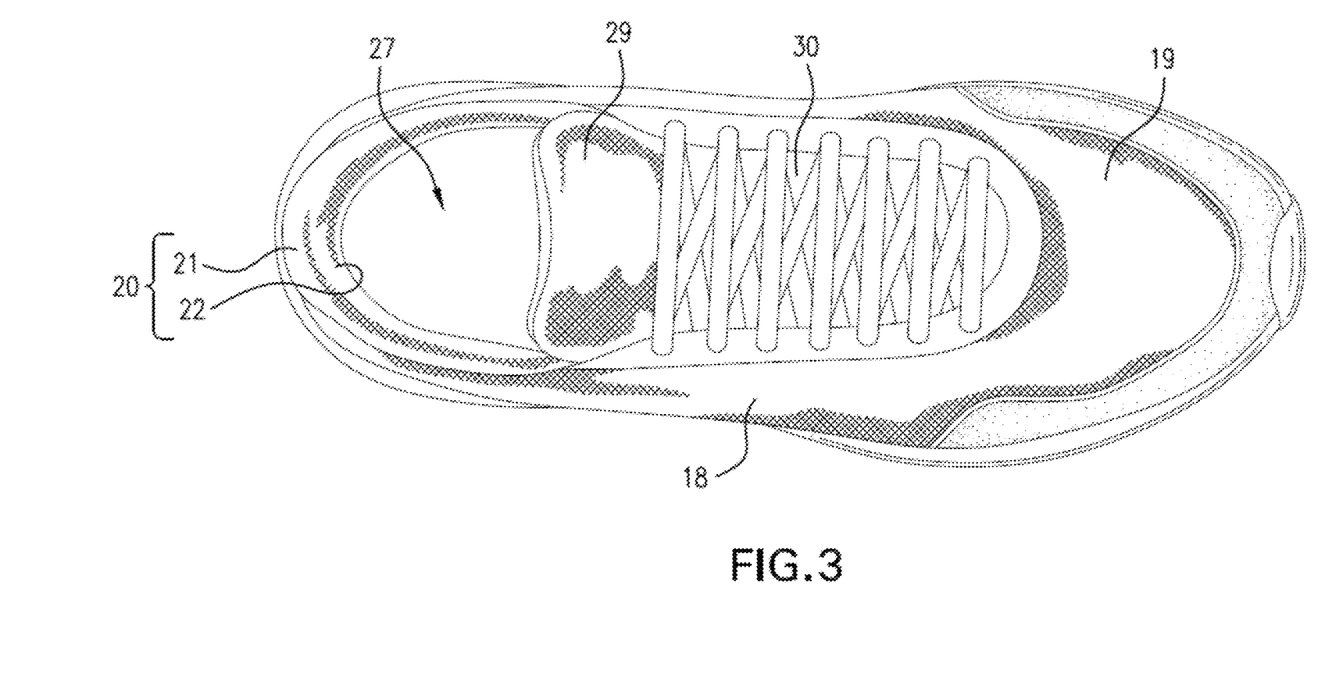
FIG. 3 is a plan view of an exemplary athletic footwear with vertically lapped nonwovens made of hydrophobic and hydrophilic materials in an upper and an insole of footwear.

As shown in FIG. 3, the insole 27 is made of a material, or combinations of materials, soft to touch and highly absorbing, thus enhancing the comfort of the wearer when the layer is in contact with the wearer's foot. In this embodiment, the inner layer 27 of the insole is made of 10-100% (e.g., 40% or more and preferably 80% or more and up to 100%) of hydrophilic materials whereas the outer layer of the insole is made of 10-100% (e.g., 40% or more and preferably 80% or more and up to 100%) of hydrophobic materials. Alternatively, the hydrophilic layer may be made of hydrophilic or hydrophobic materials that are later fabricated or coated with a hydrophilic fiber hydrophilic fiber finish (e.g., Hydroperm® manufactured by Archroma), Nonax® 6001-A/6001-B manufactured by Pulcra Chemicals, etc.) on the surface. Similarly, the hydrophobic layer may be made of hydrophobic materials or of hydrophobic or hydrophilic materials with a hydrophobic fiber finish e.g., Smartrepel® Hydro (manufactured by Archroma), Repellan® (manufactured by Pulcra Chemicals), etc. on the surface.

In a particularly preferred embodiment of the invention, the upper 19, 18, 20 and the tongue 29 are made of the hydrophilic and/or the hydrophobic materials listed above. Since the inner layer 22 of the upper 20 (also referring to inner layers of upper portions 18, 19) is in direct contact with the foot, the inner layer 22 is made of 10-100% (e.g., 40% or more and preferably 80% or more and up to 100%) of hydrophilic materials whereas the outer layer 21 of the upper 20 (also including inner layers of upper portions 18, 19) is made of 10-100% (e.g., 40% or more and preferably 80% or more and up to 100%) of hydrophobic materials. In some embodiments, the hydrophilic layer may be made of hydrophilic or hydrophobic materials that are later fabricated or coated with a hydrophilic fiber hydrophilic fiber finish (e.g., Hydroperm® manufactured by Archroma), Nonax® 6001-A/6001-B manufactured by Pulcra Chemicals, etc.) on the surface. Alternatively, the hydrophobic layer may be made of hydrophilic or hydrophobic materials that are later fabricated or coated with a hydrophobic fiber finish (e.g., Smartrepel® Hydro manufactured by Archroma), Repellan® manufactured by Pulcra Chemicals, etc.) on the surface.

Figure 4:
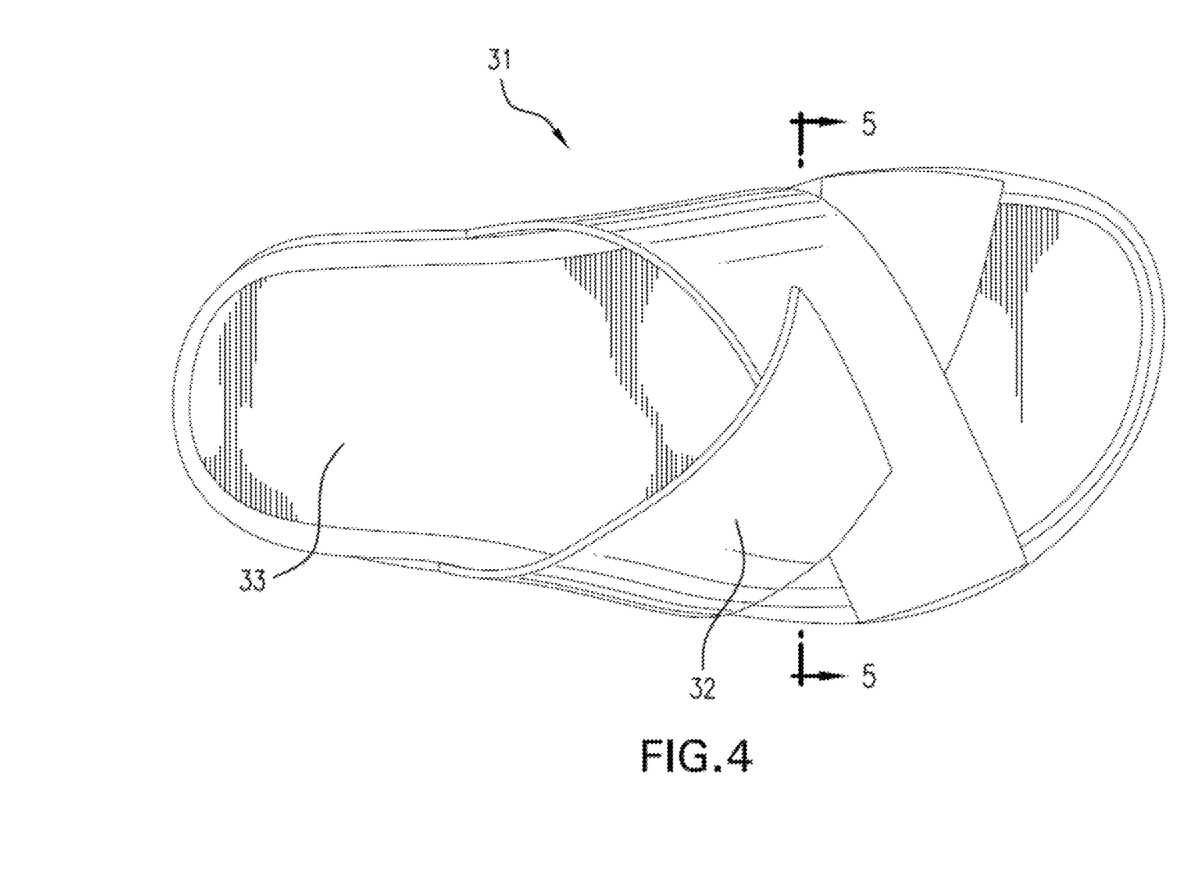
FIG. 4 is a plan view of an exemplary sandal-type footwear with vertically lapped nonwovens in a dual layer in an upper and a sole of the footwear.

In FIG. 4, a sandal-style footwear with an upper 32 that is not continuously attached or connected to the entirety of the outer peripheral edge of the sole 33 is shown. The footwear 31 includes an upper 32 in a form of one or more straps. The foot strap may be substituted with an upper of any desired design and the size and shape of the foot strap can be varied in accordance with what is known in the art. In this embodiment, the foot strap 32 (i.e. upper) and the insole 33 comprise the vertically lapped nonwoven bilayer of hydrophilic and hydrophobic materials. In some embodiments, only the foot strap 32 is constructed in a nonwoven bilayer form. In this case, the sole 33 is a molded recyclable or recycled material or combinations of materials, for example, a rubber sole could be used, but of course, other suitable materials could be used. Some exemplary recycled materials include polyester in the form of regenerated fiber and shredded post-industrial scrap. Virgin fibers, regenerated fibers or combinations thereof may also be used. In certain embodiments, the sole may be in a single layer and/or is in a nonwoven bilayer of hydrophilic and hydrophobic materials.

Figure 5:
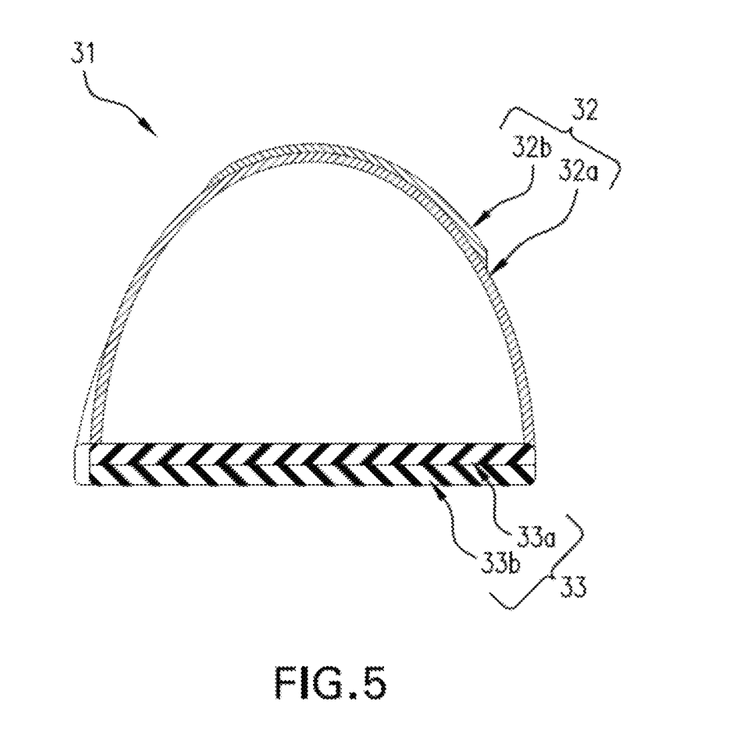
FIG. 5 is a cross-sectional view of the sandal-type footwear with vertically lapped nonwovens in an upper and a sole made of hydrophobic and hydrophilic materials.

FIG. 5 shows a cross-sectional view of the footwear 31 shown in FIG. 4. The foot strap 32 can be separately manufactured and later attached (i.e., glued, bonded or needled) to the sole 33 in accordance with what is known in the art. Alternatively, the upper foot strap 32 and sole 33 may be configured as a flat layer of nonwovens made of hydrophilic and hydrophobic materials, which may be used as an insert to be molded afterward. Moreover, the nonwovens of the upper 32 and sole 33 of the footwear 31, may be further treated to include additional features including cooling, anti-allergen, probiotic (odor control), deodorizer (UV activated), antimicrobial, and scent, which may be applied by utilizing digital printing technology or any methods known in the art.

Similarly, the inner layers of upper 32a and sole 33a are made of 10-100% (e.g., 40% or more and preferably 80% or more and up to 100%) of hydrophilic materials whereas the outer layers of upper 32b and sole 33b are made of 10-100% (e.g., 40% or more and preferably 80% or more and up to 100%) of hydrophobic materials. In some embodiments, the hydrophilic layer may be made of hydrophilic or hydrophobic materials that are later fabricated or coated with a hydrophilic fiber hydrophilic fiber finish (e.g., Hydroperm® manufactured by Archroma), Nonax® 6001-A/6001-B manufactured by Pulcra Chemicals, etc.) on the surface. Alternatively, the hydrophobic layer may be made of hydrophilic or hydrophobic materials that are later fabricated or coated with a hydrophobic fiber finish (e.g., Smartrepel® Hydro manufactured by Archroma), Repellan® manufactured by Pulcra Chemicals, etc.) on the surface.

Figure 6:
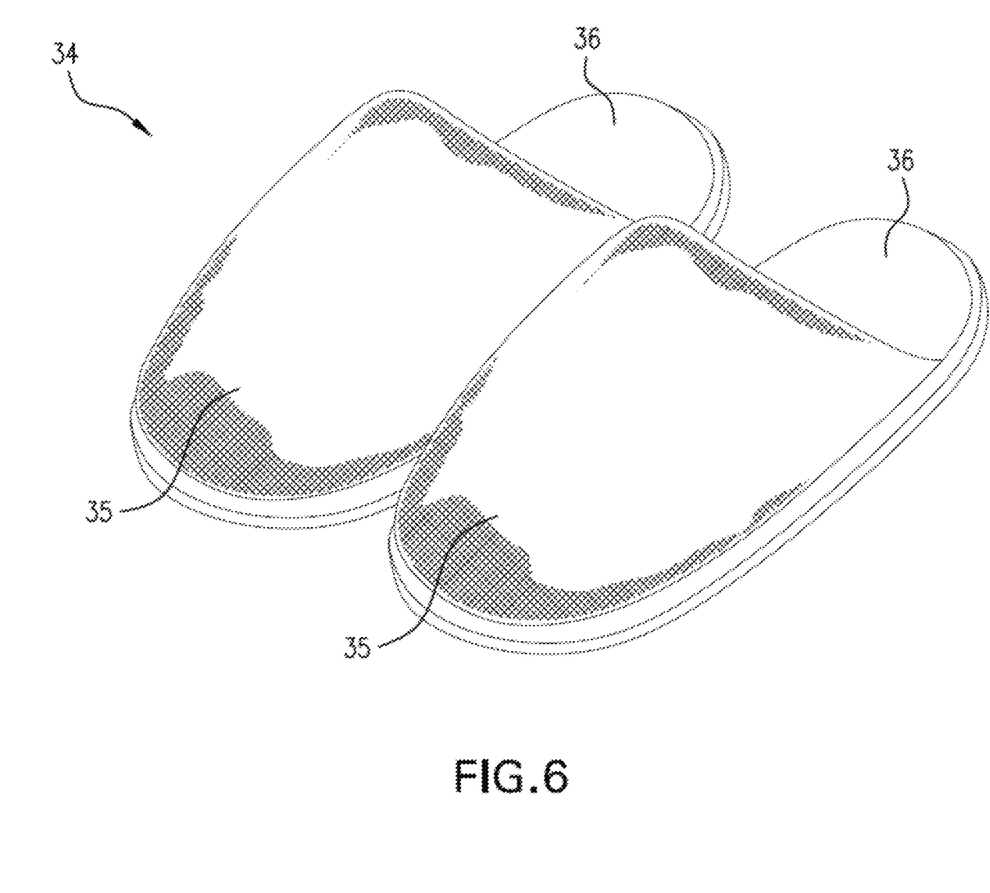
FIG. 6 is another perspective view of exemplary limited-use closed-toe slippers with vertically lapped nonwovens in a dual layer in an upper and a sole of the footwear.

In FIG. 6, a plan view of another exemplary application of the vertically lapped nonwoven dual layers in the upper 35 and/or the sole 36 of closed-toe slippers is shown. In some embodiments, the upper 35 and sole 36 of the footwear 34 may further comprise a pad or a cushion made of highly water absorbing materials, in addition to the nonwoven bilayer of hydrophilic and hydrophobic components. Preferably, prior to assembly of footwear components, the nonwoven upper 35 is manufactured as a flat layer. The flat layer of the upper 35 may be cut by hand, laser or is die cut and is further attached to the sole 36. Alternatively, the vertically lapped nonwoven materials may be used with a last (i.e., foot-shaped mechanical form) as an insert within a mold to generate the shoe's upper. A wide variety of molding processes having different molds for different sized shoes, shoe uppers or shoe insoles may be applicable. Other suitable additional materials, such as fabric and mesh, may be added to give enhanced structural support if needed.

Figure 7:
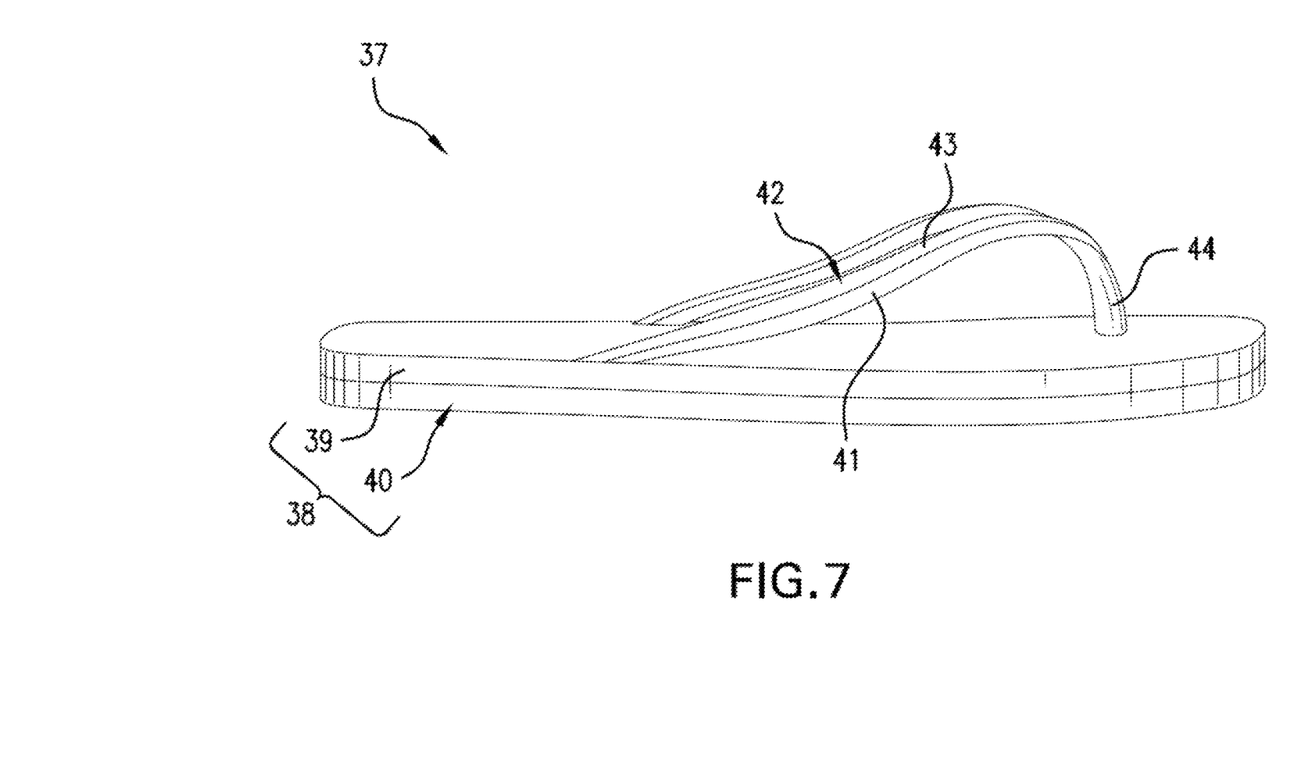
FIG. 7 is a side view of an exemplary limited-use flip-flop with vertically lapped nonwovens in a dual layer of hydrophobic and hydrophilic materials in an upper and a sole of the footwear.

Referring to FIG. 7, in a flip-flop-type footwear 37, the nonwoven layer 43 is in a shape of a thong and is referred to as an upper in this embodiment. In some embodiments, the sole 38 of the footwear is in a single configuration of a nonwoven bilayer. In this embodiment, the inner layers 39, 41 of bilayers are made of hydrophilic materials whereas the outer layers 40, 42 are made of hydrophobic materials listed above. Preferably, a post or body portion 44 of the thong is fixed and attached to the sole. The post 44 may be made flexible or rigid by adding varying amounts of composition material or combinations of materials, such as fabric, leather, rubber or synthetic material or another suitable material having sufficient strength to secure the thong, into the nonwoven bilayer of the footwear.

In particularly preferred embodiments, the nonwovens layers disclosed herein are environmentally friendly as the nonwovens are recyclable after proper treatment in the appropriate facilities. In addition, 10-100% of the nonwovens and materials for the nonwovens used for the footwear layers may be from recycled fabrics and the percentage of recycled fabrics varies based upon the strength of material needed for the intended applications and desired characteristics of the footwear.

All percentages disclosed herein are in volume percent, unless otherwise indicated.

It is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided it is understood that each intervening value, to the tenth of the unit of the lower limit unless the context clearly dictates otherwise, between the upper and lower limit of that range and any other stated or intervening value in that state range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely", "only" and the like in connection with the recitation of claim elements or use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

While the invention has been described in terms of its preferred embodiments, those skilled in the art will recognize that the invention can be practiced with modification within the spirit and scope of the appended claims. Accordingly, the present invention should not be limited to the embodiments as described above but should further include all modifications and equivalents thereof within the spirit and scope of the description provided herein.

What is claimed is:

1. Footwear, comprising:
   a sole; and
   an upper, wherein the sole of the footwear is connected to at least one side of the upper, wherein at least a portion of the upper ranging from 10-100% of the upper and/or at least a portion of the sole ranging from 10-100% of the sole comprises multiple layers of vertically lapped nonwoven material comprising at least an inner layer which is at least partially hydrophilic and at least an outer layer which is at least partially hydrophobic wherein the at least an inner layer is relatively closer to a subject's foot than the at least an outer layer when the footwear is worn on the subject's foot, wherein the at least an outer layer is an outermost layer of the upper and/or sole and wherein the multiple layers are configured to wick moisture from the at least an inner layer to the at least an outer layer.

2. The footwear of claim 1, wherein the at least an outer layer comprises polyester, acrylic, modacrylic, polypropylene, nylon or combinations thereof.

3. The footwear of claim 1, wherein the at least an inner layer comprises cellulosic fibers, rayon, lyocell, cotton, wool, linen, modal or combinations thereof.

4. The footwear of claim 1, wherein the height of the plurality of layers together is 0.04 to 0.1 inches.

5. The footwear of claim 1, wherein the sole comprises the multiple layers of vertically lapped nonwoven material.

6. The footwear of claim 1, wherein the footwear is made of 80-100% recycled materials.

7. The footwear of claim 1, wherein the footwear is 80-100% recyclable.

8. The footwear of claim 1, wherein at least some of the multiple layers are processed via digital printing to apply at least one treatment selected from cooling, anti-allergen, probiotic, deodorizer, antimicrobial, scent or combinations thereof.

9. The footwear of claim 1, wherein the upper comprises the multiple layers of vertically lapped nonwoven material.

* * * * *